(12) United States Patent
Pinder

(10) Patent No.: US 8,130,949 B2
(45) Date of Patent: Mar. 6, 2012

(54) PARTIALLY REVERSIBLE KEY OBFUSCATION

(75) Inventor: Howard G. Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 12/407,884

(22) Filed: Mar. 20, 2009

(65) Prior Publication Data

US 2010/0241872 A1    Sep. 23, 2010

(51) Int. Cl.
*H04L 9/00* (2006.01)
*H04K 1/00* (2006.01)

(52) U.S. Cl. .............................. 380/44; 380/29; 380/259

(58) Field of Classification Search ........................ None
See application file for complete search history.

(56) References Cited

U.S. PATENT DOCUMENTS

| | | |
|---|---|---|
| 4,141,005 A | 2/1979 | Bonner et al. |
| 4,760,599 A | 7/1988 | Okamoto et al. |
| 5,301,231 A | 4/1994 | Abraham et al. |
| 5,557,678 A | 9/1996 | Ganesan |

(Continued)

OTHER PUBLICATIONS

U.S. Appl. No. 12/503,291, filed Jul. 15, 2009 entitled "Use of Copyright Text in Key Derivation Function", Inventor: Pinder.

(Continued)

*Primary Examiner* — Jung Kim
*Assistant Examiner* — Robert Leung
(74) *Attorney, Agent, or Firm* — Merchant & Gould

(57) ABSTRACT

Techniques are provided to obfuscate seed values to produce a decryption key for a simplified content protection scheme. A first repeatable sequence is performed that encrypts a value stored in a first memory location using a value stored in the second memory location to produce an encrypted value and the value stored in the first memory location is overwritten with the encrypted value and then applying a constraining function to the value stored in the second memory location to produce a result and the value stored in the second memory location is overwritten with the result, wherein the result contains a less entropy compared an entropy level of the value in the second memory location prior to applying the constraining function. This sequence is repeated, but the values used in the first and second memory locations are used in opposite fashion. Techniques are also provided to perform the reverse operation and de-obfuscate a decryption key.

18 Claims, 8 Drawing Sheets

U.S. PATENT DOCUMENTS

| | | |
|---|---|---|
| 6,766,305 B1 | 7/2004 | Hoover et al. |
| 7,151,832 B1 | 12/2006 | Fetkovich et al. |
| 7,209,561 B1 * | 4/2007 | Shankar et al. ............... 380/262 |
| 7,508,945 B1 * | 3/2009 | Ferre Herrero ............... 380/268 |
| 2002/0037081 A1 | 3/2002 | Rogoff et al. |
| 2005/0105736 A1 * | 5/2005 | Chen et al. .................... 380/277 |
| 2005/0213759 A1 | 9/2005 | Tsuchida |
| 2006/0126827 A1 | 6/2006 | Milleville |
| 2008/0019517 A1 | 1/2008 | Munguia et al. |

OTHER PUBLICATIONS

U.S. Office Action dated Oct. 13, 2011 cited in U.S. Appl. No. 12/503,291, 26 pgs.

* cited by examiner

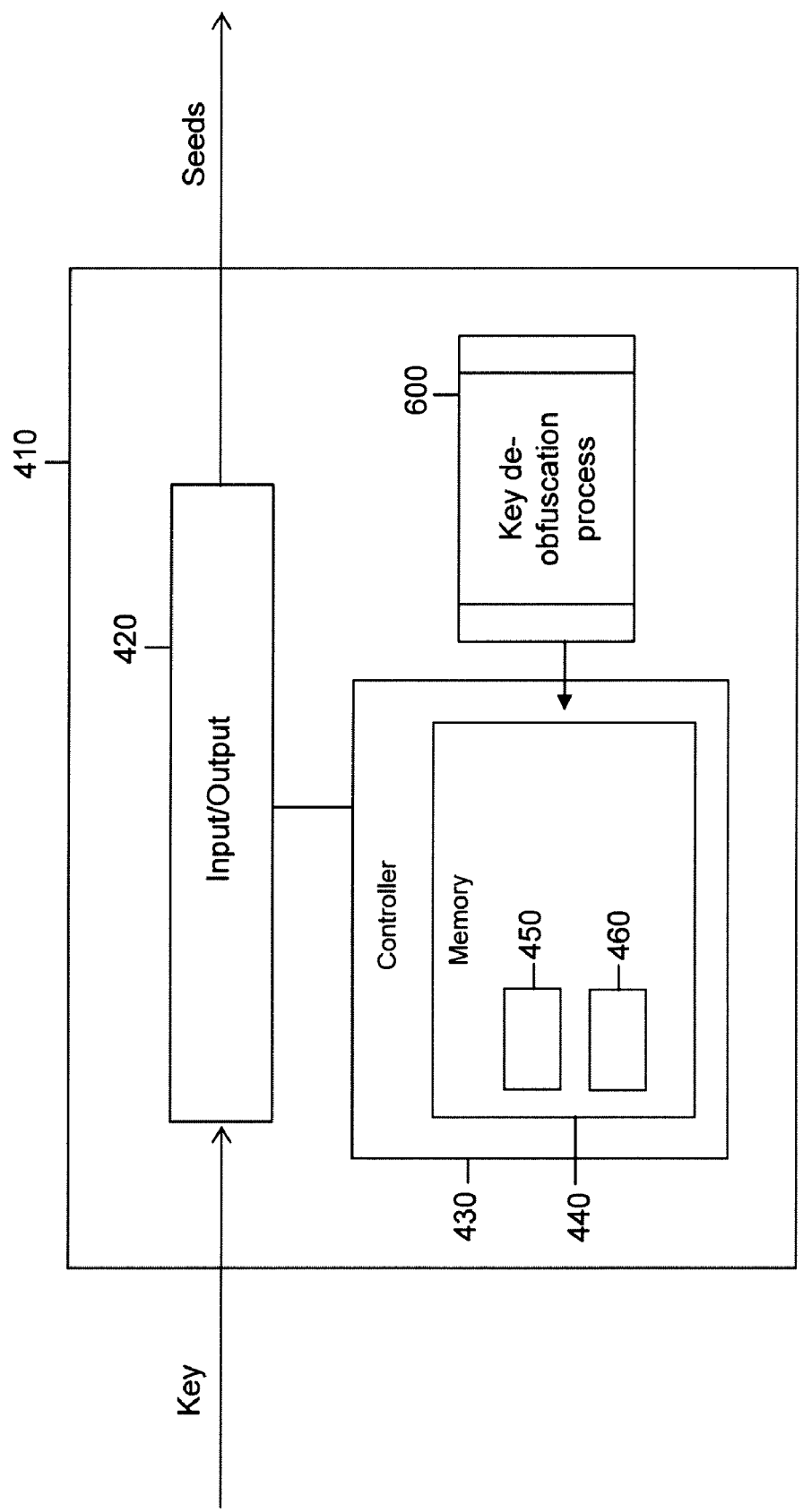

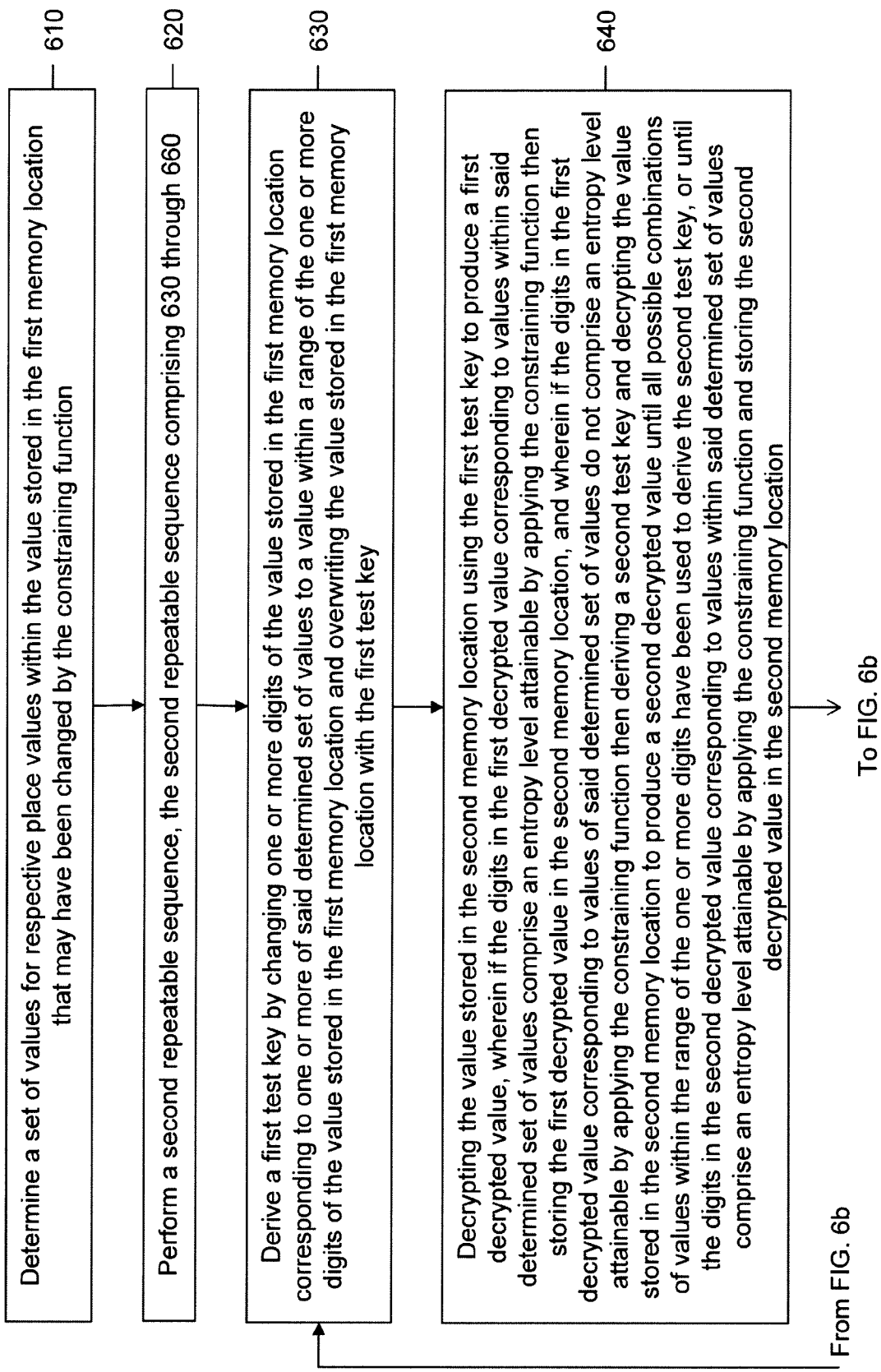

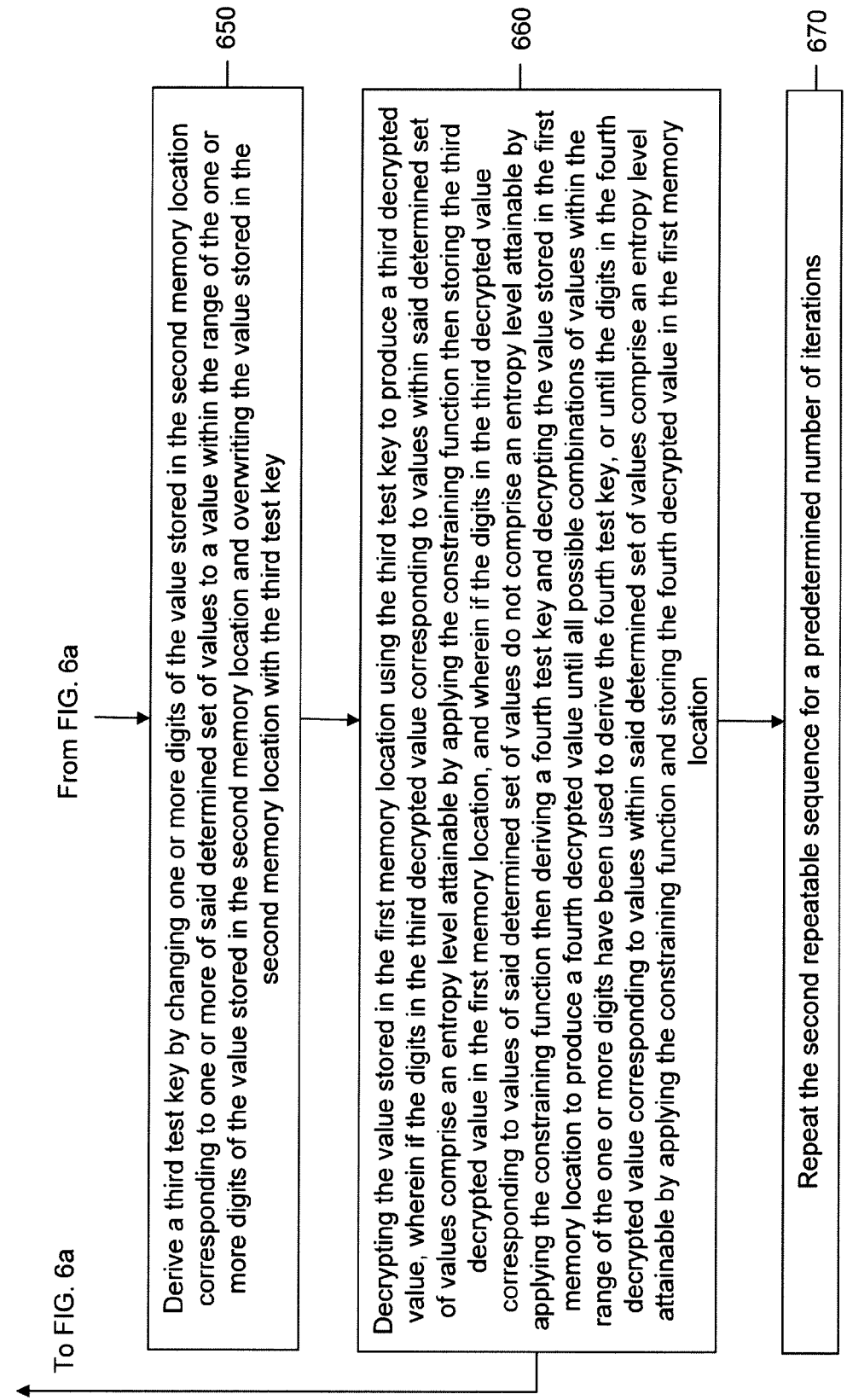

PARTIALLY REVERSIBLE KEY OBFUSCATION

TECHNICAL FIELD

The present disclosure relates generally to generating encryption keys and particularly to techniques for generating seeds that can be used to generate a key by a device that knows the seed generation process.

BACKGROUND

Since language and information took on written form data privacy and secrecy have been an issue. In the modern world symmetric block ciphers have become widely used to encrypt insecure information into a form that only those with the key can access. Well known block cipher methods include the Data Encryption Standard (DES) and the Advanced Encryption Standard (AES). In applying DES or AES a designer can choose a mode of operation such as electronic codebook or cipher block chaining among others. All modes of operation use an iterative process to encrypt (and decrypt using an inverse process) that repeats for a number of rounds. Each round involves using an encryption function, e.g., a Feistel network, which uses a seed and the current output of the encryption function combined with a previous output of the encryption function to produce the next input to the encryption function.

In the process of establishing a cryptographic key many applications use a custom transformation. A custom transformation is a non-standard or non-obvious method or algorithm that modifies the data during key generation to increase the strength of the key against attack. Key generating applications may use a one-way function as the custom transformation, but the value of the resulting final key cannot be controlled because there are too many possible input values. An invertible function can be used for the custom transformation, such as a symmetric block cipher as mentioned above. However, in this case the symmetric key becomes an attack point.

BRIEF DESCRIPTION OF THE DRAWINGS

FIG. 4 illustrates an example block diagram of an apparatus that is configured to implement a key de-obfuscation process in accordance with an embodiment of the present invention.

FIGS. 6a and 6b illustrate an example flow chart generally depicting the key de-obfuscation process in accordance with an embodiment of the present invention.

DETAILED DESCRIPTION

Overview

Figure 1:
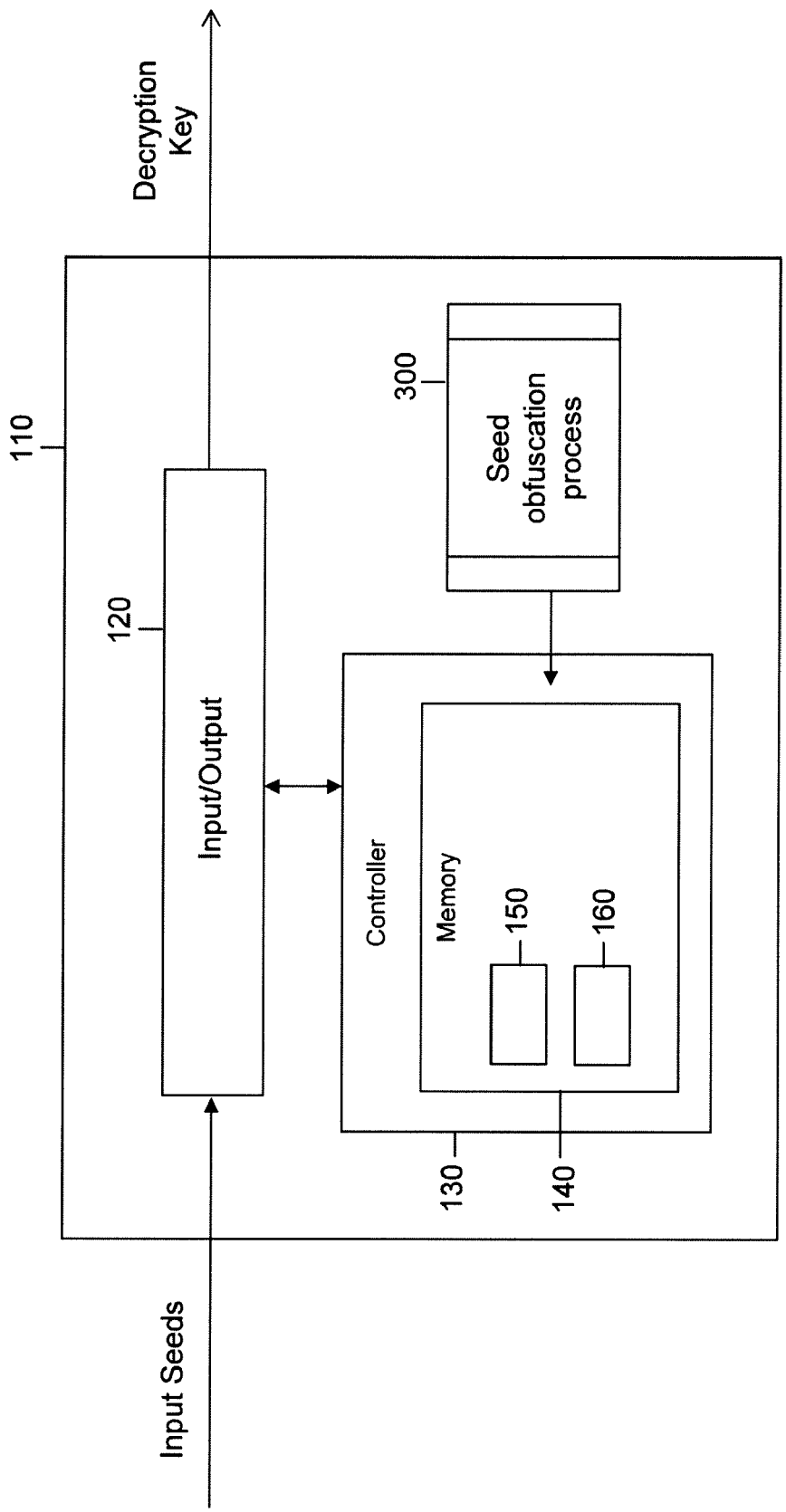
FIG. 1 illustrates an example block diagram of a device configured to implement a seed obfuscation process in accordance with an embodiment of the present invention.

Techniques are provided herein to obfuscate two seed values to create a decryption key. A seed value is stored in a first memory location and another seed value is stored in a second memory location. A first repeatable sequence is performed and comprises:

1) Encrypting the value stored in the first memory location using the value stored in the second memory location to produce a first encrypted value and overwriting the value stored in the first memory location with the first encrypted value;
2) Applying a constraining function to the value stored in the second memory location to produce a first result and overwriting the value stored in the second memory location with the first result, wherein the first result has less entropy compared to an entropy level of the value stored in the second memory location prior to applying the constraining function.
3) Encrypting the value stored in the second memory location using the value stored in the first memory location to produce a second encrypted value and overwriting the value in the second memory location with the second encrypted value;
4) Applying the constraining function to the value stored in the first memory location to produce a second result and overwriting the value stored in the first memory location with the second result, wherein the second result has less entropy compared to an entropy level of the value stored in the first memory location prior to applying the constraining function.

The first repeatable sequence is repeated for a predetermined number of iterations, where the last value to be encrypted becomes a decryption key.

Techniques are also provided herein to perform the reverse operation and derive two input seed values which will produce a given decryption key for a given number of repetitions of the sequence. First a set of values for respective place values within the value stored in the first memory location that may have been changed by the constraining function are determined. A second repeatable sequence is performed and comprises:

1) Deriving a first test key by changing one or more digits of the value stored in the first memory location corresponding to one or more of said determined set of values to a value within a range of the one or more digits of the value stored in the first memory location and overwriting the value stored in the first memory location with the first test key;
2) Decrypting the value stored in the second memory location using the first test key to produce a first decrypted value, wherein if the digits in the first decrypted value corresponding to values within said determined set of values comprise an entropy level attainable by applying the constraining function then storing the first decrypted value in the second memory location, and wherein if the digits in the first decrypted value corresponding to values of said determined set of values do not comprise an entropy level attainable by applying the constraining function then deriving a second test key and decrypting the value stored in the second memory location to produce second decrypted value until all possible combinations of values within the range of the one or more digits have been used to derive the second test key, or until the digits in the second decrypted value corresponding to values within said determined set of values comprise an entropy level attainable by applying the constraining function and storing the second decrypted value in the second memory location;
3) Deriving a third test key by changing one or more digits of the value stored in the second memory location corresponding to one or more of said determined set of values to a value within the range of the one or more digits of the value stored in the second memory location and overwriting the value stored in the second memory location with the third test key; and 4) Decrypting the value stored in the first memory location using the third test key to produce a third decrypted value, wherein if the digits in the third decrypted value corresponding to values within said determined set of values comprise an entropy level attainable by applying the constraining function then storing the third decrypted value in the first memory location, and wherein if the digits in the third decrypted value corresponding to values of said determined set of values do not comprise an entropy level attainable by applying the constraining function then deriving a fourth test key and decrypting the value stored in the first memory location to produce fourth decrypted value until all possible combinations of values within the range of the one or more digits have been used to derive the fourth test key, or until the digits in the fourth decrypted value corresponding to values within said determined set of values comprise an entropy level attainable by applying the constraining function and storing the fourth decrypted value in the first memory location.

The second repeatable sequence is repeated for a predetermined number of iterations, wherein the last value to be decrypted becomes a first seed value and the last value to be constrained becomes a second seed value.

The constraining function becomes part of the custom transform mentioned above. If an attacker implements the same custom transformation while attempting to hack a system, the attacker can be detected and pursued legally. In addition, a custom transformation allows a service provider to confront an attacker with one more barrier to overcome in order to defeat the system.

In general, an encryption device, e.g., an encoder at a cable television system headend facility (HEF), may use two random seed values to perform the seed obfuscation process to generate a key. The encryption device then uses the key to encrypt a service. The two random seeds are sent to a decryption device, e.g., a set-top box (STB) at a subscriber premise, which performs the same obfuscation process as the encryption device to produce the same key. The key is used by the set top box to decrypt the service.

However, in certain applications the key is provided by an outside party and not generated at the HEF. The HEF does not have access to the two seed values originally used to generate the key. One way to obtain seed values is to perform the reverse of the obfuscation process, hereinafter referred to as the de-obfuscation process, to generate two seed values from the outside key. Therefore, it would be desirable to employ a function that is similar to a one-way function, but invertible or partially invertible such that it is possible to find input values that produce a desired output key. In that way the key can be provided from an outside system, used to encrypt a service (e.g., at the HEF), and obfuscated to produce seeds for transmission to a decryption device (e.g., the STB).

Referring first to FIG. 1, a device 110 that is configured to implement a seed obfuscation process 300 in accordance with an embodiment of the present invention is depicted generally at reference numeral 100. The device 110 comprises an input/output (IO) module 120, a controller 130, and a memory 140. The memory 140 further comprises a first memory location 150 and a second memory location 160.

The functions of the controller 130 may be implemented by logic encoded in one or more tangible media (e.g., embedded logic such as an application specific integrated circuit (ASIC), digital signal processor instructions, software that is executed by a processor, etc.), wherein the memory 140 stores data used for the computations described herein (and/or to store software or processor instructions that are executed to carry out the computations described herein). Thus, the process 300 may be implemented with fixed logic or programmable logic (e.g., software/computer instructions executed by a processor) and the controller 130 may be a programmable processor, programmable digital logic (e.g., field programmable gate array) or an ASIC that comprises fixed digital logic, or a combination thereof.

The IO module 120 is configured to interface with the controller 130 and the memory 140. The IO module 120 transmits and receives data and/or instructions. The controller 130 is configured to store or overwrite the values in the first memory location 150 and the values in the second memory location 160 with data received from the IO module 120. The controller 130 implements the obfuscation process 300. The process 300 is described in greater detail in conjunction with FIGS. 2 and 3.

Figure 2:
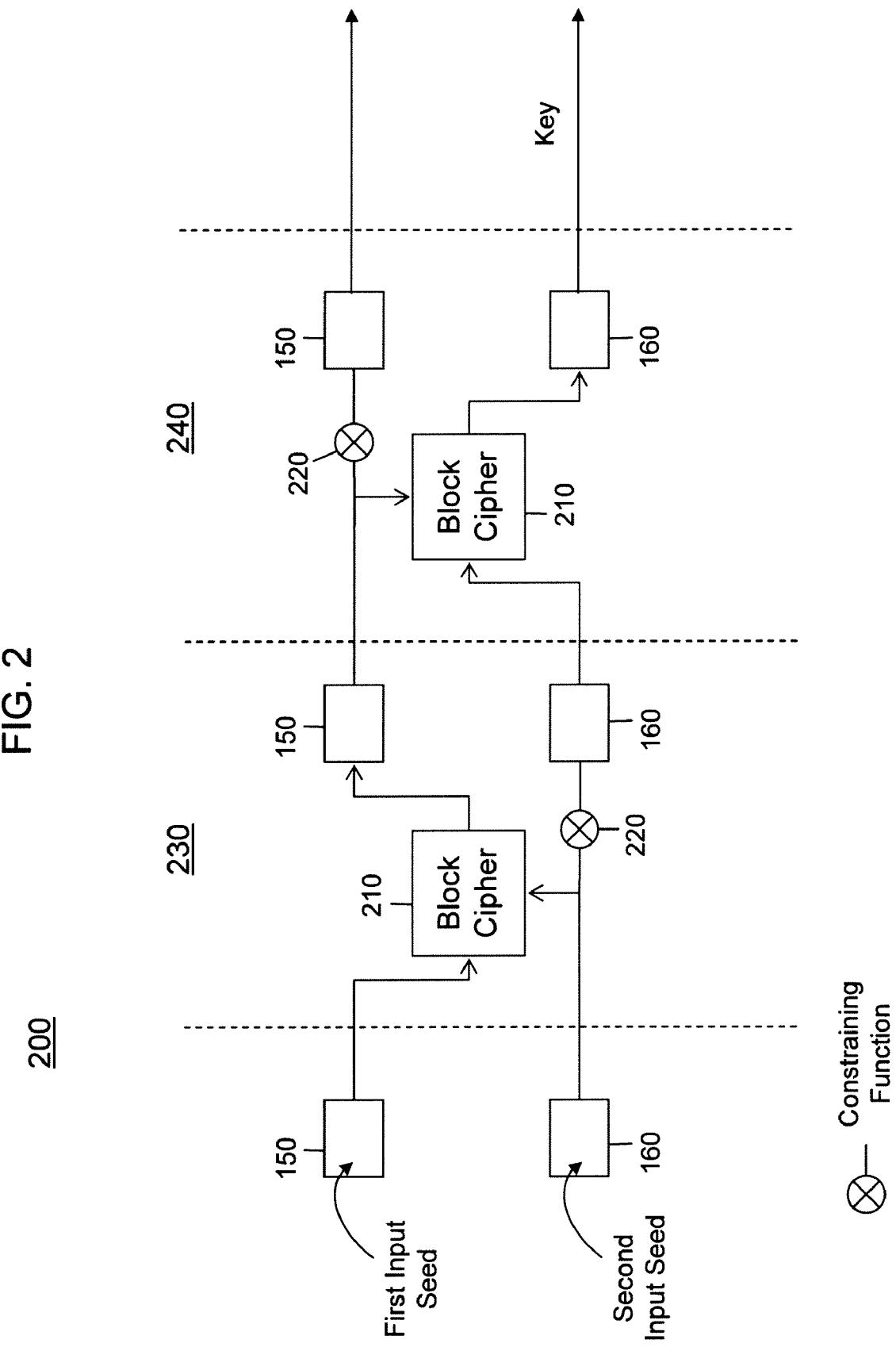
FIG. 2 illustrates an example block diagram of a method to produce a key using the seed obfuscation process in accordance with an embodiment of the present invention.

Turning now to FIG. 2 an example block diagram of a method to produce a decryption key in accordance with an embodiment of the present invention is shown at 200. The first memory location 150 and second memory location 160 from FIG. 1 are depicted in a series of stages or rounds separated by a dashed line and generally depicted at 230 and 240. The memory locations are each intended to be the same location in memory and are overwritten during each stage 230, 240. Each stage 230 and 240 also depicts a block cipher 210, and constraining or entropy reducing function 220. Entropy as used herein refers to information entropy (e.g., Shannon entropy). Prior to the first stage 230 a first seed to be obfuscated is stored in the first memory location 150 and a second seed is stored in the second memory location 160. The input seeds may comprise a seed from a de-obfuscation process, a random seed, a pseudo-random seed, or an initializer optimized for use with the constraining function 220.

The block cipher 210 may comprise one of the block ciphers well known to those skilled in the encryption arts such as DES and AES noted above or may comprise other custom cipher algorithms. Although depicted as a block cipher for purpose of an example embodiment, this is not meant to be limiting and other ciphers may be used. The constraining function 220 may consist of a simple entropy reducing function, e.g., a bitmask, in which the output of the function contains less information than the input to the function. Other constraining functions may be used, e.g., exclusive or (XOR) could be used within a seed. By way of example the first 7 bytes of an 8 byte seed might be XOR'd with each other to produce the $8^{th}$ byte.

Figure 3A:
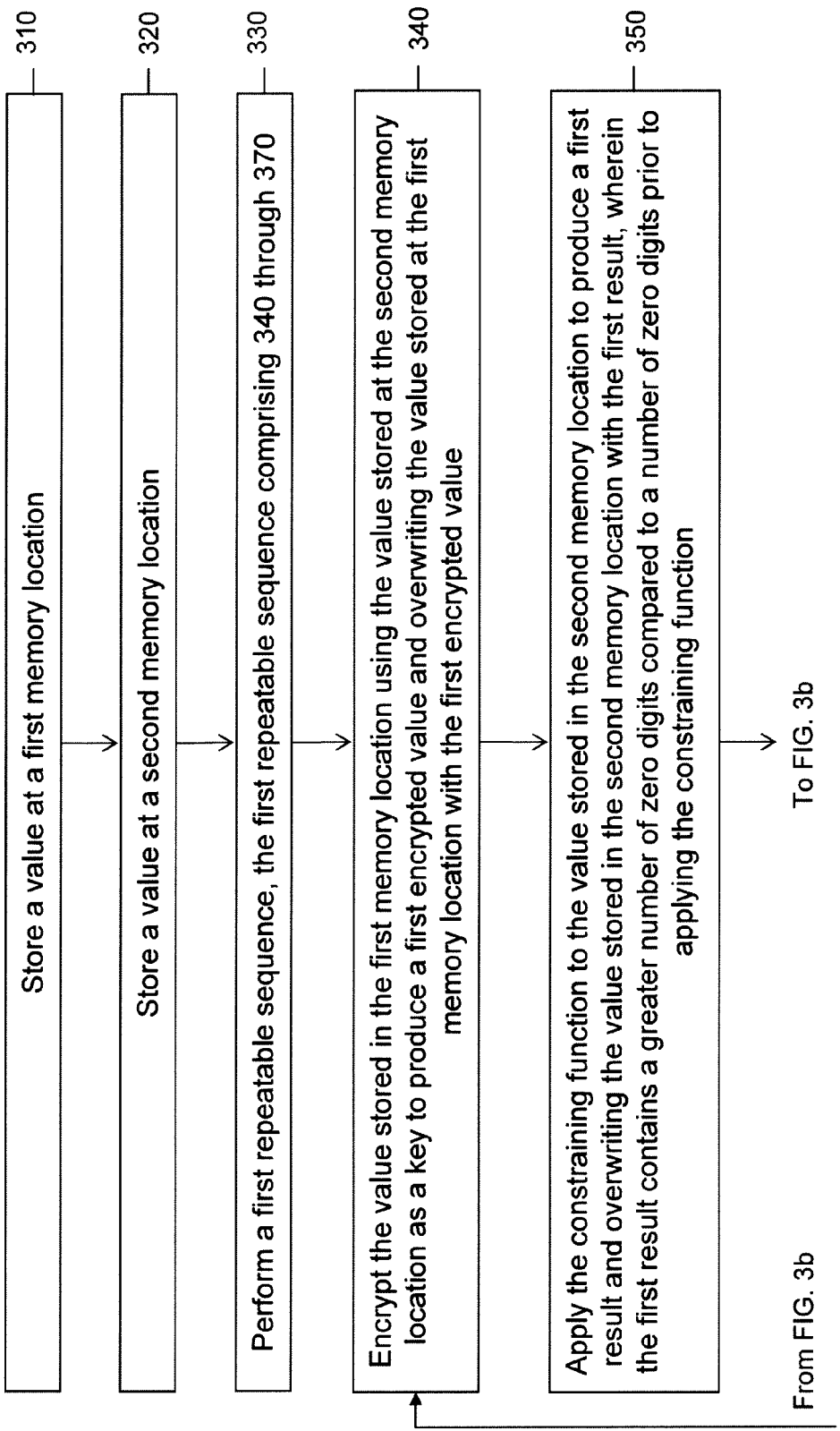
FIGS. 3a and 3b illustrate an example flow chart generally depicting the seed obfuscation process in accordance with an embodiment of the present invention.
Figure 3B:
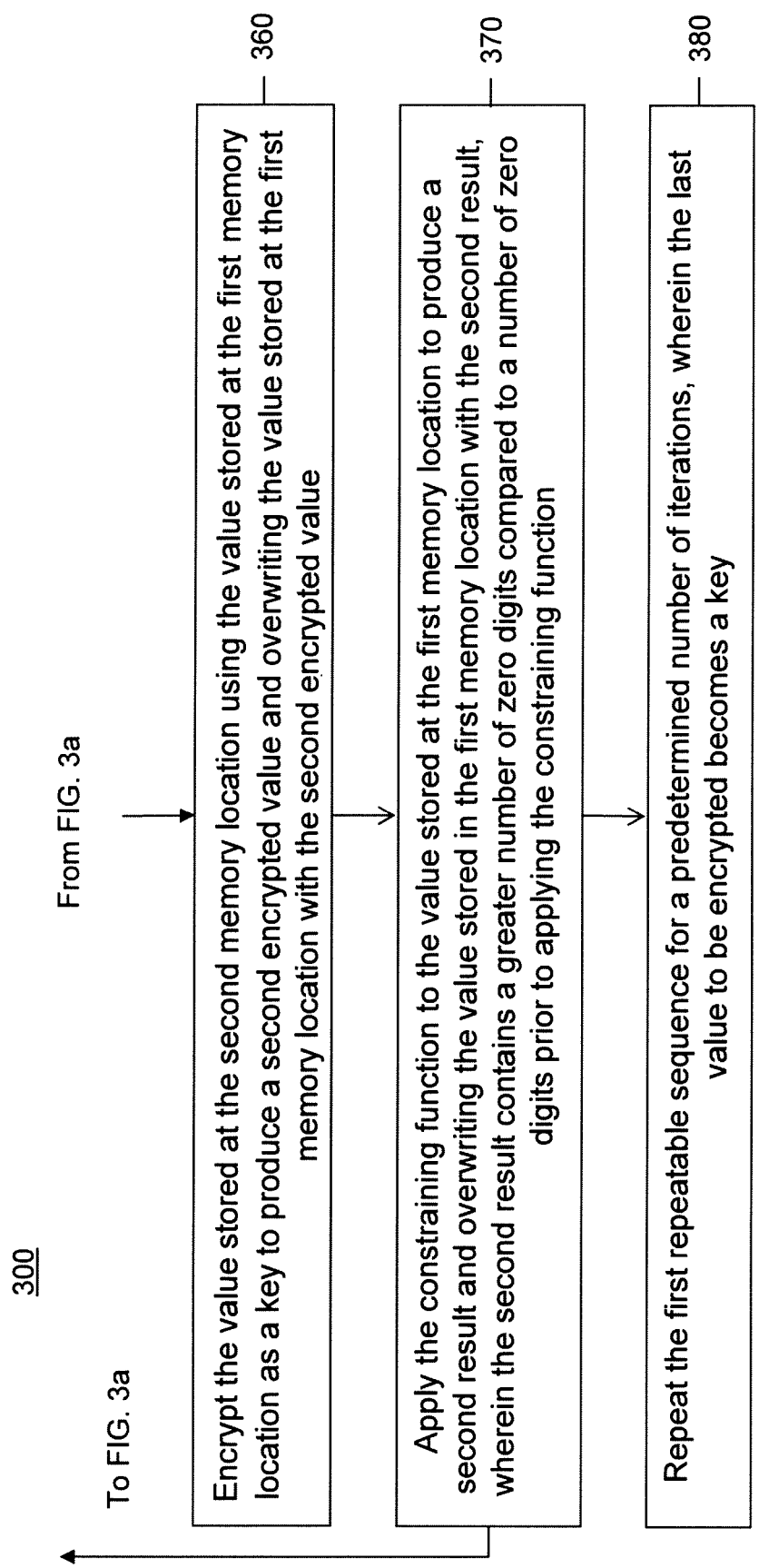

Referring to FIGS. 3a and 3b, with continued reference to FIG. 2, the obfuscation process 300 is now described. At 310, a value, e.g., an input seed is stored in a first memory location 150. At 320, a value, e.g., a second seed is stored in a second memory location 160. At 330, a first repeatable sequence is performed comprising steps 340 to 370. At 340, the value stored in the first memory location 150 is encrypted by the block cipher 210 using the value stored in the second memory location 160 to produce a first encrypted value and the value stored in the first memory location 150 is overwritten with the first encrypted value. At 350, the constraining function 220 is applied to the value stored in the second memory location 160 to produce a first result and the value stored in the second memory location 160 is overwritten with the first result, wherein the first result has less entropy compared to an entropy level of the value stored in the second memory location 160 prior to applying the constraining function 220. Steps 340 and 350 are represented generally at stage 230.

Next at 360, the value stored in the second memory location 160 is encrypted by the block cipher 210 using the value stored in the first memory location 150 to produce a second encrypted value and the value stored in the second memory location 160 is overwritten with the second encrypted value. At 370, the constraining function 220 is applied to the value stored in the first memory location 150 to produce a second result and the value stored in the second memory location 160 is overwritten with the second result. The second result has less entropy compared to entropy of the value stored in the first memory location 150 prior to applying the constraining function 220. It should be understood that certain situations may occur in which values to be constrained may already have lower entropy whereby the constraining function may not be effective in decreasing the entropy level of the value to be constrained. Steps 360 and 370 are represented generally at stage 240.

Finally at 380, the first repeatable sequence 330 is repeated for a predetermined number of iterations, wherein the last value to be encrypted becomes a decryption key. It will be appreciated that the first repeatable sequence 330 should be repeated consecutively and in order such that the block cipher 210 and the constraining function 220 are applied alternately to the values stored in the first 150 and second 160 memory locations. It will also be appreciated that the first half of repeatable sequence 330 (i.e., stage 230) may be repeated one additional time such that an odd or even number of encryption stages may be iterated.

It will be appreciated by those skilled in the art that seed values may be used by an encrypting device, e.g., an encoding device at a headend facility or multiservice operator (MSO), in order to create a service key using this obfuscation function and encrypting a service with that key, and the same seed values may be sent in encrypted form to a decryption device, e.g., a cable set top box or digital subscriber line (DSL) modem, which can decrypt them and then perform the same obfuscation function in order to produce the same service key which can be used to decrypt the service, to provide a simplified content protection scheme (encryption/decryption scheme) for a decryption device. Since the constraining function 220 and the block cipher 210 are known to the encryption device and the decryption device, the decryption device can produce the same service key as the encryption device, by using the same obfuscation function described here. The encrypted seed values may be sent, e.g., in an MPEG-2 transport stream and used in a simplified manner for content entitlement, i.e., in entitlement control messages (ECMs) or in entitlement management messages (EMMs). Alternatively, the seed values may be sent in unencrypted clear form.

As described previously the obfuscation process 300 obfuscates seed values to produce a decryption key. Now the inverse operation is described in which the decryption key is de-obfuscated to provide a set of original seed values. FIGS. 4 through 6b depict the inverse process described with respect to FIGS. 1 through 3b, with FIGS. 4 through 6b analogous to FIGS. 1 through 3b. Turning now to FIG. 4, a device 410 that is configured to implement a key de-obfuscation process 600 in accordance with an embodiment of the present invention is depicted generally at reference numeral 400. The device 410 comprises and input/output (IO) module 420, a controller 430, and a memory 440. The memory 440 further comprises a first memory location 450 and a second memory location 460.

The functions of the controller 430 may be implemented by logic encoded in one or more tangible media (e.g., embedded logic such as an ASIC, digital signal processor instructions, software that is executed by a processor, etc.), wherein the memory 440 stores data used for the computations described herein (and/or to store software or processor instructions that are executed to carry out the computations described herein). Thus, the process 600 may be implemented with fixed logic or programmable logic (e.g., software/computer instructions executed by a processor) and the controller 430 may be a programmable processor, programmable digital logic (e.g., field programmable gate array) or an ASIC that comprises fixed digital logic, or a combination thereof.

The IO module 420 is configured to interface with the controller 430 and the memory 440. The IO module 420 receives a key, e.g., a key that may be used to encrypt and decrypt a service (e.g., a pay per view movie). The controller 430 stores an input seed in the first memory location 450 and stores the key in the second memory location 460. The input seed may comprise a random seed, a pseudo-random seed, or other initializer. The entropy level of the input seed should match the entropy level attainable by the constraining function because any output from the constraining function would be used for obfuscation. If the entropy level does not match, then the constraining function is applied to the input seed. The controller 430 implements the key de-obfuscation process 600. The process 600 is described in greater detail in conjunction with FIGS. 5 and 6. It will be appreciated that for simplicity the device in FIG. 4 may be the same device as that depicted in FIG. 1, and as such, the memory locations 450 and 460, are the same as the memory locations 150 and 160.

Figure 5:
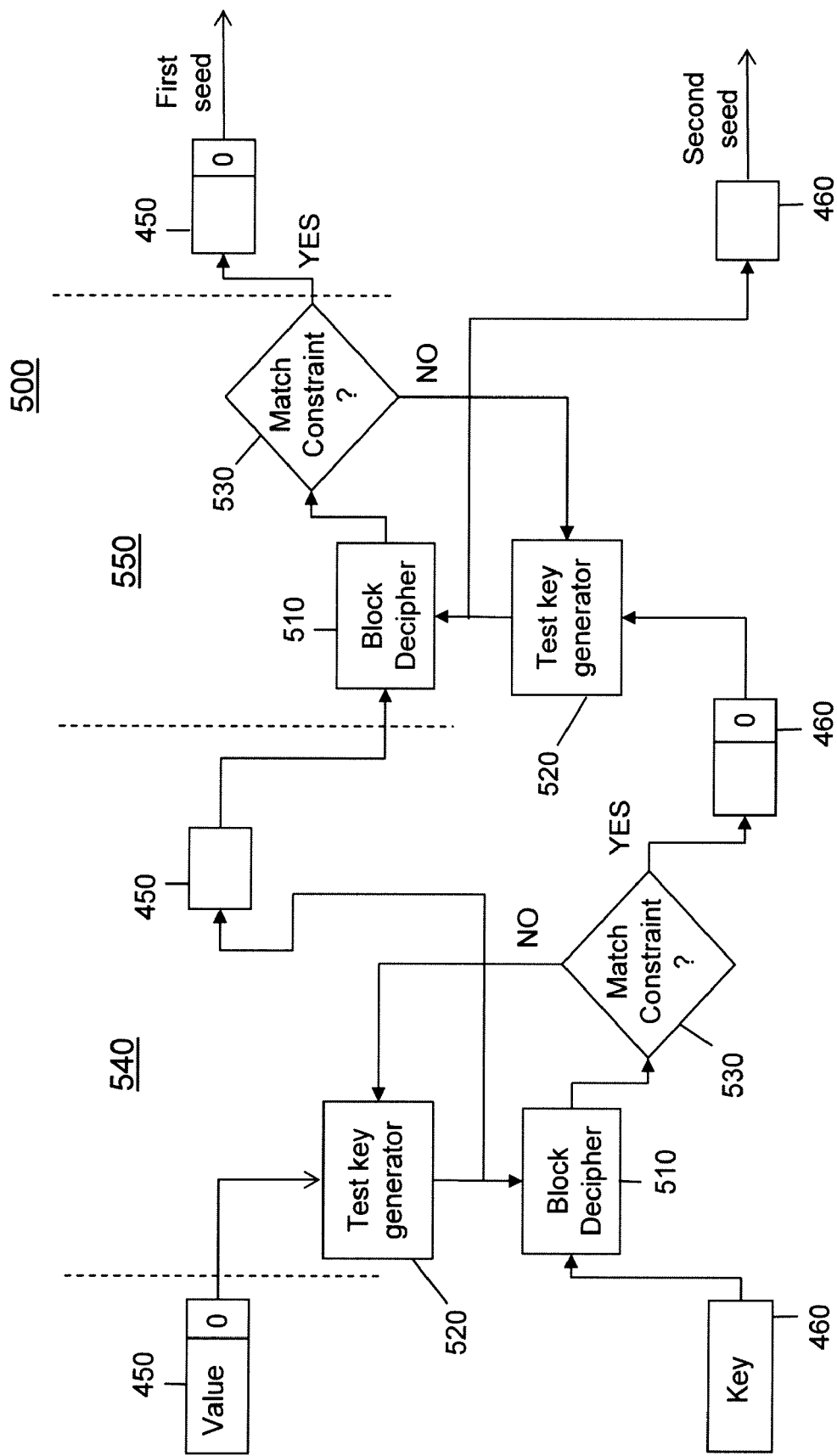
FIG. 5 illustrates an example block diagram of a method to produce seeds using the key de-obfuscation process in accordance with an embodiment of the present invention.

Turning now to FIG. 5 an example block diagram of a method to produce seed values in accordance with an embodiment of the present invention is shown generally at 500. The first memory location 450 and second memory location 460 from FIG. 4 are depicted in a series of stages or rounds separated by a dashed line and generally depicted at 540 and 550. The memory locations 450 and 460 are each intended to be the same location in memory and are overwritten during each stage 540, 550 of the de-obfuscation process 600. Each stage 540 and 550 also depicts a block decipher 510, a test key generator 520, and a decision block 530. Unlike the entropy or constraining function 220 described in conjunction with FIG. 2 the test key generator 520 has to generate all possible combinations of information that could have possibly been removed by the constraining function 220. Prior to the first stage 540 a decryption key to be de-obfuscated is stored in the second memory location 460 and a value complying with the constraining function is stored in the first memory location 450. It should be understood that the decryption key may be the last value to have been encrypted by the constraining function 220, during the key obfuscation process 300.

The example in FIG. 5 depicts the input seed in the first memory location 450 prior to the first stage 540 with the last four bits (referred to as a nibble) previously set to zero by the constraining function, i.e., the input seed complies with the constraining function. This indicates a bitmask constraining function, e.g., a logical "and" operation with the value F F0h (hexadecimal), was used to constrain the input seed by removing any information contained in the last nibble. Any output from the block decipher 510 must also have the last nibble set to zero because previous inputs to the block cipher used in the obfuscation process would or will have had the last nibble set to zero by the F . . . F0h bitmask constraining function.

The block decipher 510 may comprise one of the well-known block ciphers such as DES and AES noted above or may comprise other custom cipher algorithms. Although depicted as a block decipher for purpose of an example embodiment, this is not meant to be limiting and other ciphers may be used. The block decipher 510 should perform the inverse operations of the block cipher 210. The constraining function is known to the test key generator 520. The test key generator 520 uses the knowledge to perform iterative "guesses" to determine possible values for the input seed prior to being constrained. The test key generator 520 may determine values set to zero by a bitmask function, or otherwise test if the value is consistent with the constraining function in use.

Referring now to FIGS. 6a and 6b, with continued reference to FIG. 5, the key de-obfuscation process 600 is now described. At 610, a set of values are determined for respective place values within the value, e.g., the input seed, stored in the first memory location 450. For example, if the F . . . F0h bitmask constraining function was previously used or will be used to obfuscate, then the last four places could have been set to zero, i.e., the one's place, the two's place, the four's place, and the eight's place in the binary representation (or simply the one's place in hexadecimal). At 620, a second repeatable sequence is performed in which steps 630 through 660 may be repeated.

At 630, a first test key is derived by changing one or more digits of the value stored in the first memory location 450 corresponding to one or more of the determined set of values to a value within the range of the one or more digits of the value stored in the first memory location 450. The first memory location 450 is overwritten with the first test key. For binary representations the range is 0b to 1b (binary), for decimal representations the range is 0 through 9, and for hexadecimal representations the range is 0h through Fh for each digit. It should be understood that other symbol representations may be employed.

Next at 640, the value stored in the second memory location 460 is decrypted using the first test key to produce a first decrypted value. At 530, if the digits in the first decrypted value corresponding to values within the determined set of values have an entropy level attainable by applying the constraining function (i.e., the decrypted value matches the constraining function) then the first decrypted value is stored in the second memory location 460, and if the digits in the first decrypted value corresponding to values of the determined set of values do not have an entropy level attainable by applying the constraining function then deriving a second test key and decrypting the value stored in the second memory location 460 to produce a second decrypted value until all possible combinations of values within the range of the one or more digits have been used to derive the second test key, or until the digits in the second decrypted value corresponding to values within said determined set of values have an entropy level attainable by applying the constraining function and the second decrypted value is stored in the second memory location 460.

For the example F . . . F0h bitmask constraining function described above the possible variations of the last nibble that could be generated by the test key generator 520 are 0000b, 0001b, 0010b . . . 1111b in a binary representation, or 0h through Fh in a hexadecimal representation. In this example the test key could be incremented and run through the block decipher 510 until the output of the block decipher 510 has an entropy attainable by using the constraining function, i.e., the output is in a form where the last nibble is zero. It should be understood that it is possible that at any stage of operation that the output of the block decipher may never match the entropy level attainable by the constraining function and in that case a new input seed is generated and the process 600 is started over. Steps 630 and 640 are represented generally at stage 540.

At 650, a third test key is derived by changing one or more digits of the value stored in the second memory location 460 corresponding to one or more of the determined set of values to a value within the range of the one or more digits of the value stored in the second memory location 460 and the value stored in the first memory location 450 is overwritten with the third test key. At 660, the value stored in the first memory location 450 is decrypted using the third test key to produce a third decrypted value. If the digits in the third decrypted value corresponding to values within the determined set of place values comprise an entropy level attainable by applying the constraining function, then the third decrypted value is stored in the second memory location 460, and if the digits in the third decrypted value corresponding to values of the determined set of values do not comprise an entropy level attainable by applying the constraining function, then deriving a fourth test key and decrypting the value stored in the first memory location 450 to produce a fourth decrypted value until all possible combinations of values within the range of the one or more digits have been used to derive the fourth test key, or until the digits in the fourth decrypted value corresponding to values within said determined set of values comprise an entropy level attainable by applying the constraining function and storing the fourth decrypted value in the first memory location 450. Steps 650 and 660 are represented generally at stage 550.

Finally at 670, the second repeatable sequence 620 is repeated for a predetermined number of iterations. The last value to be decrypted becomes the first seed value, and the value stored in the second memory location 460 becomes the second seed value. It will be appreciated that the repeatable sequence 620 should be repeated consecutively and in order such that the block decipher 510 and test key generator 520 are applied alternately to the values stored the first 450 and second 460 memory locations. It will also be appreciated that the first half of the second repeatable sequence 620 (i.e., stage 540) may be repeated one additional time such that an odd or even number of stages may be iterated.

Techniques have been described herein to obfuscate seed values to produce a decryption key for a simplified content protection scheme. Techniques have also been described to perform the reverse operation and de-obfuscate a decryption key. These techniques allow a key to be provided by an outside source and transmitted from an encryption device to decryption device in the form of seeds without directly revealing the content of the key.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    storing a value in a first memory location;
    storing a value in a second memory location;
    performing a first repeatable sequence, the first repeatable sequence comprising:
        encrypting the value stored in the first memory location using the value stored in the second memory location to produce a first encrypted value and overwriting the value stored in the first memory location with the first encrypted value;

applying a constraining function to the value stored in the second memory location to produce a first result and overwriting the value stored in the second memory location with the first result, wherein the first result has less entropy compared to an entropy of the value stored in the second memory location prior to applying the constraining function;

encrypting the value stored in the second memory location using the value stored in the first memory location to produce a second encrypted value and overwriting the value in the second memory location with the second encrypted value; applying the constraining function to the value stored in the first memory location to produce a second result and overwriting the value stored in the first memory location with the second result, wherein the second result has less entropy compared to an entropy level of the value stored in the first memory location prior to applying the constraining function; and repeating the first repeatable sequence for a predetermined number of iterations, where the last value to be encrypted becomes a decryption key;

determining a set of values for respective place values within the value stored in the first memory location that may have been changed by the constraining function;

performing a second repeatable sequence, the second repeatable sequence comprising:

deriving a first test key by changing one or more digits of the value stored in the first memory location corresponding to one or more of said determined set of values to a value within a range of the one or more digits of the value stored in the first memory location and overwriting the value stored in the first memory location with the first test key;

decrypting the value stored in the second memory location using the first test key to produce a first decrypted value, wherein if the digits in the first decrypted value corresponding to values within said determined set of values comprise an entropy level attainable by applying the constraining function then storing the first decrypted value in the second memory location, and wherein if the digits in the first decrypted value corresponding to values of said determined set of values do not comprise an entropy level attainable by applying the constraining function then deriving a second test key and decrypting the value stored in the second memory location to produce a second decrypted value until all possible combinations of values within the range of the one or more digits have been used to derive the second test key, or until the digits in the second decrypted value corresponding to values within said determined set of values comprise an entropy level attainable by applying the constraining function and storing the second decrypted value in the second memory location;

deriving a third test key by changing one or more digits of the value stored in the second memory location corresponding to one or more of said determined set of values to a value within the range of the one or more digits of the value stored in the second memory location and overwriting the value stored in the second memory location with the test key;

decrypting the value stored in the first memory location using the third test key to produce a third decrypted value, wherein if the digits in the third decrypted value corresponding to values within said determined set of values comprise an entropy level attainable by applying the constraining function then storing the third decrypted value in the first memory location, and wherein if the digits in the third decrypted value corresponding to values of said determined set of values do not comprise an entropy level attainable by applying the constraining function then deriving a fourth test key and decrypting the value stored in the first memory location to produce a fourth decrypted value until all possible combinations of values within the range of the one or more digits have been used to derive the fourth test key, or until the digits in the fourth decrypted value corresponding to values within said determined set of values comprise an entropy level attainable by applying the constraining function and storing the fourth decrypted value in the first memory location; and repeating the second repeatable sequence for a predetermined number of iterations.

2. The method of claim 1, wherein repeating the first repeatable sequence comprises repeating a first half of the first repeatable sequence one additional time.

3. The method of claim 1, wherein encrypting the value stored in the first memory location or encrypting the value stored in the second memory location comprises using one of a block cipher, symmetric key cipher, asymmetric key cipher, and a stream cipher.

4. The method of claim 1, further comprising:
transmitting information indicative of the type of constraining function applied to values stored in the first and second memory locations and the predetermined number of iterations.

5. The method of claim 1, further comprising:
receiving information indicative of the type of constraining function to apply values stored in the first and second memory locations and the predetermined number of iterations.

6. The method of claim 1, wherein repeating the second repeatable sequence comprises repeating a first half of the second repeatable sequence one additional time.

7. The method of claim 1, wherein decrypting the value stored in the first memory location or decrypting the value stored in the second memory location comprises using one of a block cipher, symmetric key cipher, asymmetric key cipher, and a stream cipher.

8. A method comprising:
storing a value in a first memory location;
storing a value in a second memory location;
determining a set of values for respective place values within the value stored in the first memory location that may have been changed by the constraining function;
performing a first repeatable sequence, the first repeatable sequence comprising:
deriving a first test key by changing one or more digits of the value stored in the first memory location corresponding to one or more of said determined set of values to a value within a range of the one or more digits of the value stored in the first memory location and overwriting the value stored in the first memory location with the first test key;
decrypting the value stored in the second memory location using the first test key to produce a first decrypted value, wherein if the digits in the first decrypted value corresponding to values within said determined set of values comprise an entropy level attainable by applying the constraining function then storing the first decrypted value in the second memory location, and wherein if the digits in the first decrypted value corresponding to values of said determined set of values do not comprise an entropy level attainable by applying the constraining function then deriving a second test key and decrypting the value stored in the second memory location to produce a second decrypted value until all possible combinations of values within the range of the one or more digits have been used to derive the second test key, or until the digits in the second decrypted value corresponding to values within said determined set of values comprise an entropy level attainable by applying the constraining function and storing the second decrypted value in the second memory location;

deriving a third test key by changing one or more digits of the value stored in the second memory location corresponding to one or more of said determined set of values to a value within the range of the one or more digits of the value stored in the second memory location and overwriting the value stored in the second memory location with the test key;

decrypting the value stored in the first memory location using the third test key to produce a third decrypted value, wherein if the digits in the third decrypted value corresponding to values within said determined set of values comprise an entropy level attainable by applying the constraining function then storing the third decrypted value in the first memory location, and wherein if the digits in the third decrypted value corresponding to values of said determined set of values do not comprise an entropy level attainable by applying the constraining function then deriving a fourth test key and decrypting the value stored in the first memory location to produce a fourth decrypted value until all possible combinations of values within the range of the one or more digits have been used to derive the fourth test key, or until the digits in the fourth decrypted value corresponding to values within said determined set of values comprise an entropy level attainable by applying the constraining function and storing the fourth decrypted value in the first memory location; and repeating the second repeatable sequence for a predetermined number of iterations.

9. The method of claim 8, wherein repeating comprises repeating a first half of the second repeatable sequence one additional time.

10. The method of claim 8, wherein decrypting the value stored in the first memory location or decrypting the value stored in the second memory location comprises using one of a block cipher, symmetric key cipher, asymmetric key cipher, and a stream cipher.

11. The method of claim 8, further comprising:
transmitting information indicative of the type of constraining function applied to values stored in the first and second memory locations and the predetermined number of iterations.

12. The method of claim 8, further comprising:
receiving information indicative of the type of constraining function to apply values stored in the first and second memory locations and the predetermined number of iterations.

13. The method of claim 8, further comprising:
performing a second repeatable sequence, the second repeatable sequence comprising:
encrypting the value stored in the first memory location using the value stored in the second memory location to produce a first encrypted value and overwriting the value stored in the first memory location with the first encrypted value;
applying a constraining function to the value stored in the second memory location to produce a first result and overwriting the value stored in the second memory location with the first result, wherein the first result has less entropy compared to an entropy level of the value stored in the second memory location prior to applying the constraining function;
encrypting the value stored in the second memory location using the value stored in the first memory location to produce a second encrypted value and overwriting the value in the second memory location with the second encrypted value;
applying the constraining function to the value stored in the first memory location to produce a second result and overwriting the value stored in the first memory location with the second result, wherein the second result has less entropy compared to an entropy level of the value stored in the first memory location prior to applying the constraining function; and
repeating the second repeatable sequence for a predetermined number of iterations.

14. The method of claim 13, wherein repeating comprises repeating a first half of the second repeatable sequence one additional time.

15. The method of claim 13, wherein encrypting the value stored in the first memory location or encrypting the value stored in the second memory location comprises using one of a block cipher, symmetric key cipher, asymmetric key cipher, and a stream cipher.

16. Logic encoded in one or more non-transitory, tangible media for execution and when executed, by a computer reading the media, is operable to:
store a value in a first memory location;
store a value in a second memory location;
perform a first repeatable sequence, the first repeatable sequence comprising operation:
determine a set of values for respective place values within the value stored in the first memory location that may have been changed by the constraining function;
derive a first test key by changing one or more digits of the value stored in the first memory location corresponding to one or more of said determined set of values to a value within a range of the one or more digits of the value stored in the first memory location and overwriting the stored in the first memory location with the test key;
decrypt the value stored in the second memory location using the first test key to produce a first decrypted value, wherein if the digits in the first decrypted value corresponding to values within said determined set of values comprise an entropy level attainable by applying the constraining function then storing the first decrypted value in the second memory location, and wherein if the digits in the first decrypted value corresponding to values of said determined set of values do not comprise an entropy level attainable by applying the constraining function then deriving a second test key and decrypting the value stored in the second memory location to produce a second decrypted value until all possible combinations of values within the range of the one or more digits have been used to derive the second test key, or until the digits in the second decrypted value corresponding to values within said determined set of values comprise an entropy level attainable by applying the constraining function and storing the second decrypted value in the second memory location;

derive a third test key by changing one or more digits of the value stored in the second memory location corresponding to one or more of said determined set of values to a value within the range of the one or more digits of the value stored in the second memory location and overwriting the value stored in the second memory location with the third test key; decrypt the value stored in the first memory location using the third test key to produce a third decrypted value, wherein if the digits in the third decrypted value corresponding to values within said determined set of values comprise an entropy level attainable by applying the constraining function then storing the third decrypted value in the first memory location, and wherein if the digits in the third decrypted value corresponding to values of said determined set of values do not comprise an entropy level attainable by applying the constraining function then deriving a fourth test key and decrypting the value stored in the first memory location to produce a fourth decrypted value until all possible combinations of values within the range of the one or more digits have been used to derive the fourth test key, or until the digits in the fourth decrypted value corresponding to values within said determined set of values comprise an entropy level attainable by applying the constraining function and storing the fourth decrypted value in the first memory location;

repeat the first repeatable sequence for a predetermined number of iterations;

perform a second repeatable sequence, the second repeatable sequence comprising operation:

encrypt the value stored in the first memory location using the value stored in the second memory location to produce a first encrypted value and overwriting the value stored in the first memory location with the first encrypted value;

apply a constraining function to the value stored in the second memory location to produce a first result and overwriting the value stored in the second memory location with the first result, wherein the first result has less entropy compared to an entropy level of the value stored in the second memory location prior to applying the constraining function;

encrypt the value stored in the second memory location using the value stored in the first memory location to produce a second encrypted value and overwriting the value in the second memory location with the second encrypted value;

apply the constraining function to a value stored in the first memory location to produce a second result and overwriting the value stored in the first memory location with the second result, wherein the second result has less entropy compared to an entropy level of the value stored in the first memory location prior to applying the constraining function; and repeat the second repeatable sequence for a predetermined number of iterations.

17. The logic encoded in one or more non-transitory, tangible media executable by a computer reading the media of claim 16, wherein the operation that repeats the first repeatable sequence further comprises repeating a first half of the first repeatable sequence one additional time and the operation that repeats the second repeatable sequence further comprises repeating a first half of the second repeatable sequence one additional time.

18. The logic encoded in one or more non-transitory, tangible media executable by a computer reading the media of claim 16, wherein the operation that encrypts the value stored in the first memory location or encrypts the value stored in the second memory location further comprises using one of a block cipher, symmetric key cipher, asymmetric key cipher, and a stream cipher, and the operation to decrypt the value stored in the first memory location or operation to decrypt the value stored in the second memory location further comprises using one of a block cipher, symmetric key cipher, asymmetric key cipher, and a stream cipher.

* * * * *